US010458209B2

(12) United States Patent
Parlar et al.

(10) Patent No.: US 10,458,209 B2
(45) Date of Patent: Oct. 29, 2019

(54) METHOD TO GRAVEL PACK USING A FLUID THAT CONVERTS TO IN-SITU PROPPANT

(71) Applicant: Schlumberger Technology Corporation, Sugar Land, TX (US)

(72) Inventors: Mehmet Parlar, Sugar Land, TX (US); Balkrishna Gadiyar, Katy, TX (US); Syed Afaq Ali, Sugar Land, TX (US); Joseph Ayoub, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 460 days.

(21) Appl. No.: 15/177,096

(22) Filed: Jun. 8, 2016

(65) Prior Publication Data
US 2016/0362965 A1 Dec. 15, 2016

Related U.S. Application Data

(60) Provisional application No. 62/173,084, filed on Jun. 9, 2015.

(51) Int. Cl.
*E21B 43/00* (2006.01)
*C09K 8/80* (2006.01)
*E21B 43/04* (2006.01)

(52) U.S. Cl.
CPC ............. *E21B 43/04* (2013.01); *C09K 8/80* (2013.01); *C09K 8/805* (2013.01); *C09K 2208/12* (2013.01); *C09K 2208/26* (2013.01)

(58) Field of Classification Search
None
See application file for complete search history.

(56) References Cited

U.S. PATENT DOCUMENTS

| | | | | |
|---|---|---|---|---|
| 3,614,985 A | * | 10/1971 | Richardson | C09K 8/5045 166/292 |
| 3,749,172 A | * | 7/1973 | Hessert | C09K 8/24 166/270 |
| 4,553,595 A | * | 11/1985 | Huang | E21B 7/04 166/278 |
| 4,972,906 A | * | 11/1990 | McDaniel | C09K 8/5086 166/276 |
| 5,196,124 A | * | 3/1993 | Connor | B09C 1/002 166/270.1 |
| 5,222,557 A | * | 6/1993 | Shu | C09K 8/572 166/276 |

(Continued)

OTHER PUBLICATIONS

Chang, F. et al., "In-Situ Formation of Proppant and Highly Permeable Blocks for Hydraulic Fracturing", SPE 173328, presented at the SPE Hydraulic Fracturing Technology Conference, The Woodlands, Texas, U. S. A., 2015, 11 pages.

*Primary Examiner* — Anuradha Ahuja

(57) ABSTRACT

A method for completing a wellbore extending through a subterranean formation may include installing a sandface completion assembly in the wellbore; pumping a solids free fluid comprising chemical precursors into an annulus formed between the subterranean formation and the sandface completion assembly; triggering and/or controlling chemical reaction between the chemical precursors to form a plurality of solid particles in the annulus.

22 Claims, 1 Drawing Sheet

(56) References Cited

U.S. PATENT DOCUMENTS

| | | | |
|---|---|---|---|
| 5,507,345 A * | 4/1996 | Wehunt, Jr. | E21B 33/124 |
| | | | 166/285 |
| 6,109,350 A * | 8/2000 | Nguyen | C09K 8/14 |
| | | | 166/281 |
| 6,883,608 B2 | 4/2005 | Parlar et al. | |
| 7,541,318 B2 * | 6/2009 | Weaver | C09K 8/62 |
| | | | 166/308.2 |
| 7,543,640 B2 | 6/2009 | MacDougall | |
| 7,562,709 B2 | 7/2009 | Saebi et al. | |
| 8,322,419 B2 | 12/2012 | Parlar et al. | |
| 8,322,420 B2 | 12/2012 | Parlar et al. | |
| 8,596,360 B2 | 12/2013 | Kippie et al. | |
| 8,869,893 B2 | 10/2014 | Navarro et al. | |
| 9,834,721 B2 * | 12/2017 | Chang | C09K 8/80 |
| 10,012,057 B2 | 7/2018 | Panamarathupalayam et al. | |
| 2007/0068675 A1 * | 3/2007 | Barry | C09K 8/02 |
| | | | 166/278 |
| 2008/0015120 A1 * | 1/2008 | Cooke, Jr. | C08G 63/06 |
| | | | 507/219 |
| 2009/0133875 A1 * | 5/2009 | Tibbles | E21B 43/04 |
| | | | 166/278 |
| 2010/0018709 A1 * | 1/2010 | Parlar | C09K 8/508 |
| | | | 166/278 |
| 2010/0193190 A1 * | 8/2010 | Blount | E21B 43/04 |
| | | | 166/285 |
| 2011/0247814 A1 * | 10/2011 | Karanikas | E21B 36/001 |
| | | | 166/288 |
| 2011/0277996 A1 * | 11/2011 | Cullick | E21B 33/138 |
| | | | 166/250.12 |
| 2012/0103607 A1 * | 5/2012 | Fitzpatrick | E21B 23/00 |
| | | | 166/278 |
| 2013/0025863 A1 * | 1/2013 | Lin | C09K 8/5083 |
| | | | 166/294 |
| 2013/0126162 A1 * | 5/2013 | Blount | E21B 43/12 |
| | | | 166/281 |
| 2015/0011443 A1 | 1/2015 | Navarro-Mascarell et al. | |

* cited by examiner

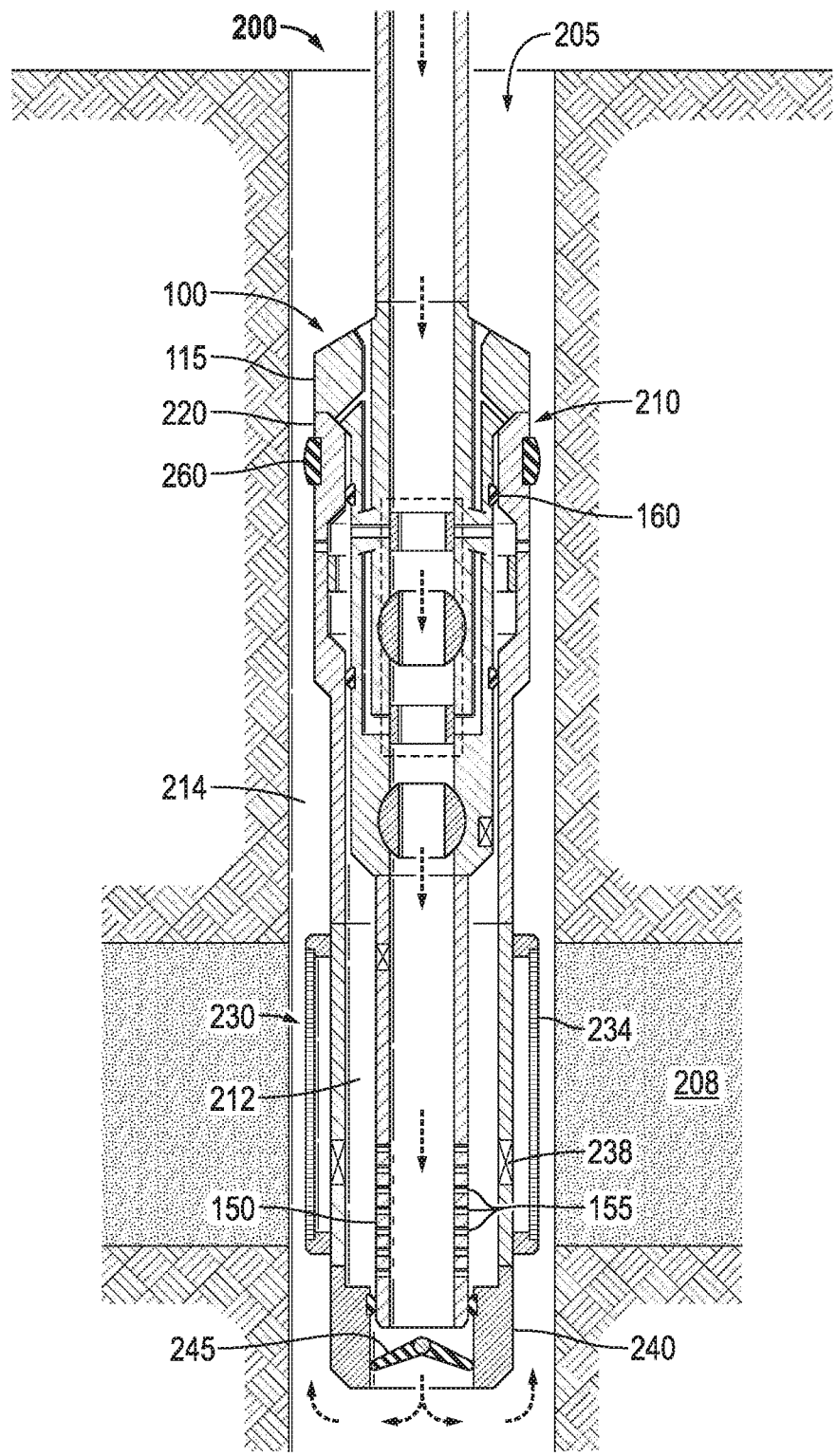

METHOD TO GRAVEL PACK USING A FLUID THAT CONVERTS TO IN-SITU PROPPANT

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

Many wells, especially in oil fields in shale formations (having water sensitivity) and/or deep-water/subsea environments, are drilled with synthetic/oil-based muds or drilling fluids. Because of the extremely high cost of intervention and high production rates, these wells require reliable completion techniques that prevent sand production and maximizes productivity throughout the entire life of the well. One such technique is open-hole gravel packing.

In unconsolidated formations, sand control measures are implemented to stabilize formation sand. Common practice for controlling sand displacement includes placement of a gravel pack to hold formation sand in place. The gravel pack is typically deposited around a screen. The gravel pack filters the sand while still allowing formation fluid to flow through the gravel, the screen and a production pipe.

There are two principal techniques used for gravel packing open holes: (1) the alternate path technique and (2) alpha-beta packing technique. The latter uses low-viscosity fluids, such as completion brines to carry the gravel from the surface and deposit it into the annulus between a sand-control screen and the wellbore. The alternate path technique, on the other hand, utilizes viscous carrier fluids; therefore the packing mechanisms of these two techniques are significantly different. The alternate path technique allows bypassing of any bridges that may form in the annulus, caused by for example high leakoff into the formation due to filtercake erosion, or exceeding the fracturing pressure, or shale-sloughing/shale-swelling or localized formation collapse on the sand control screens.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for completing a wellbore extending through a subterranean formation that includes installing a sandface completion assembly in the wellbore; pumping a solids free fluid comprising chemical precursors into an annulus formed between the subterranean formation and the sandface completion assembly; triggering and/or controlling chemical reaction between the chemical precursors to form a plurality of solid particles in the annulus.

Other aspects and advantages of the claimed subject matter will be apparent from the following description and the appended claims.

BRIEF DESCRIPTION OF DRAWINGS

FIG. 1 shows a schematic of a completion assembly in accordance with the present disclosure.

DETAILED DESCRIPTION

In one aspect, embodiments disclosed herein relate to methods of completion techniques that form solid particles in situ. More particularly, embodiments of the present disclosure may involve open hole gravel packing with the use of a solids free fluid containing chemical precursors that will transform into substantially spherical particles (and thus forming a pack) once placed in the annulus between the formation and screen.

As mentioned above, in the drilling of a well, the drilling fluid is typically circulated through the drill string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface.

In the construction of the well, a casing may be positioned within a portion of the drilled wellbore and cemented into place. The portion of the wellbore that is not lined with the casing forms the uncased or open hole section where a sand control screen assembly is placed to facilitate gravel packing for controlling the migration and production of formation sand and to stabilize the formation of the open hole section.

Once the wellbore is drilled and the casing cemented into place, the well may be completed by installing sand screens and gravel packing the open hole section so that produced fluids from the formation are allowed to flow through the gravel pack and sand screen and may be recovered through the wellbore. The open hole section may be any orientation, including vertical and horizontal hole sections, and may be in any type of well, including injector or producer wells.

After the open hole and cased hole sections are displaced with the respective displacement fluids, the drilling string may be removed from the wellbore and the desired sand control screen assembly may be run or lowered to a selected depth within the open hole section of the well bore. The sand screen assembly may be run or lowered into the wellbore on a tubular member or wash pipe, which is used for conducting fluids between the sand screen and the surface. Running the sand screen assembly to the selected depth may include positioning the sand screen in vertical or non-vertical (horizontal) sections of the well. A packer may be positioned and set in the casing above the sand screen to isolate the interval being packed. A crossover service tool may also be provided with the assembly to selectively allow fluids to flow between the annulus formed by the open hole and the screen assembly and the interior of the tubular member and wash pipe.

With the sand control screen assembly in place, a fluid of the present disclosure for forming the gravel pack is introduced into the wellbore to facilitate formation of a gravel pack and thus gravel packing of the open hole section of wellbore in the annulus surrounding the sand control screen. The fluid is typically introduced into the tubular member where it flows to the cross over tool into the annulus of the open hole section below the packer and the exterior of the sand control screen. As the solids form in situ within the open hole section surrounding the screen, any remaining fluid may pass through the screen and into the interior of the tubular member. Such fluid may be conducted to the crossover tool and into the annulus between the casing and the tubular member above the packer.

For example, referring to FIG. 1, an example schematic of a completion assembly that may be used in forming the gravel pack of the present disclosure is shown.

FIG. 1 depicts a cross sectional view of a service tool system for performing one or more hydrocarbon services, such as gravel packing, according to one or more embodiments. The service tool system 200 can include the service tool 100 secured within a completion or tubular member 210. The completion 210 can include a main body 220, a screen assembly 230, and a wash down shoe or mule shoe 240. An annulus 212 can be formed or located between the service tool 100 and the tubular member 210.

The main body 220 can be configured to connect to the body 115 of the service tool 100. The main body 220 can be connected to the screen assembly 230, and the screen assembly 230 can be connected to the wash down shoe 240. The wash down shoe 240 can include one or more flow control devices 245 disposed in an aperture or inner bore thereof. The flow control device 245 can selectively allow and/or prevent fluid flow from the wash pipe 150 through the aperture of the wash down shoe 240. The flow control device 245 can be a valve, such as a poppet valve.

When the screen assembly 230 is connected or engaged with the wash down shoe 240, the inner diameter of the screen assembly 230 and the wash down shoe 240 can form a seal. The screen assembly 230 can be or include one or more sand screens 234, which can be any filter media, such as those described below. The sand screen 234 can connect with the main body 220 at one end and with the wash down shoe 240 at the other end. In one or more embodiments, the screen assembly 230 can connect with a packer (not shown), such as a sump-packer. For example, the packer can be connected to the end of the wash pipe 150 in lieu of the wash down shoe 240. In another embodiment, the wash down shoe 240 can be integrated with or adjacent the packer (not shown).

One or more packers 260 can be disposed about the tubular member 210. For example, the packer 260 can be disposed about the exterior of the main body 220 and another packer (not shown) can be disposed adjacent the wash down shoe 240. The packer 260 can be used to isolate an "upper" or first portion of a target subterranean formation and secure the second tubular member 210 within the wellbore 205. The packer 260 can be any downhole sealing device. Illustrative packers 260 include compression or cup packers, inflatable packers, "control line bypass" packers, polished bore retrievable packers, swellable packers, other downhole packers, or combinations thereof. The packer 260 can seal an annulus 214 between the tubular member 210 and wellbore 205 adjacent the subterranean formation 208 and/or provide a sealed bore through which an upper completion conduit can convey production fluid or injection fluid from and/or into the wellbore 205 adjacent the subterranean formation 208.

In one specific embodiment, such as the one depicted in FIG. 1, the wash pipe 150 can be connected to the service tool 100, and can engage or connect to the inner diameter of the wash down shoe 240. In one or more embodiments, the wash down pipe 150 can be releasably engaged with the inner diameter of the wash down shoe 240. Accordingly, when the wash pipe 150 is movably connected to the body 115, the wash pipe 150 can be extended to prevent fluid communication between the inner diameter of the wash pipe 150 and the annulus 212. In one or more embodiments, the wash pipe 150 can include the flow ports 155. The flow ports 155 can be configured to selectively move from the first configuration to the second configuration, without imparting motion to the wash pipe 150 or service tool 100 relative to the wellbore 205, to provide fluid communication between the annulus 212 and the inner diameter of the wash pipe 150. Further, while the wash pipe 150 and flow ports 155 are shown to axially overlap with screen assembly 230, it is also envisioned that wash pipe 150 may be axially spaced from screen assembly 230 (either above or below the screen assembly 230) and fluid flowing out from wash pipe 150 into annulus 214 between the screen assembly 230 and subterranean formation 208. It is also envisioned that depending on the mechanism through which the fluid of the present disclosure flows, such mechanism (flow ports 155 or flow control device 245) may be provided with a shearing device that may trigger and/or control the chemical reaction between the chemical precursors present in the fluid of the present disclosure.

As mentioned above, the fluid of the present disclosure is a substantially solids free fluid containing chemical precursors that will transform into substantially spherical particles. The chemical precursors contained in the fluid will react to form particles in the annulus between the wellbore and the screen. Such chemical reaction may be initiated and/or controlled by the use of a shearing device (such as a choke, nozzle, and/or static mixer) through which the fluid flows. Once the reaction is complete, at least a portion of the fluid volume will have reacted (and thereby converted) into solid particles in the annulus. In various embodiments, differing portions, include the entirety of the volume in one embodiment, of the fluid will have converted. Upon completion of the reaction, any remaining fluid volume may flow from the solid particles pack into a return pipe to the surface.

Example particle sizes in U.S. mesh size may range from about 12 mesh (1.68 mm) to about 70 mesh (0.210 mm); however, a combination of different particle sizes may be used. Examples of typical particle size combinations for the gravel particles are from about 12/20 mesh (1.68 mm/0.841 mm), 16/20 mesh (1.19 mm/0.841 mm), 16/30 mesh (1.19 mm/0.595 mm), 20/40 mesh (0.841 mm/0.420 mm), 30/50 mesh (0.595 mm/0297 mm), 40/60 mesh (0.420 mm/0.250 mm) and 40/70 mesh (0.420 mm/0.210 mm). In one or more embodiments, the resulting particle size may be controlled by the use of the shearing device mentioned above. In accordance with the present disclosure, the particles may be substantially resistant to deformation.

The chemical precursors may be provided in a base or carrier fluid that may include an oleaginous fluid, non-oleaginous fluid, or emulsions thereof. Thus, the base fluid may be an oleaginous fluid free or substantially free of a non-oleaginous fluid, a non-oleaginous fluid free or substantially free of an oleaginous fluid, an invert emulsion (oleaginous external phase and non-oleaginous internal phase) or a direct emulsion (non-oleaginous external phase and oleaginous internal phase). When using emulsions, percentage of the fluid forming the external phase (either oleaginous or non-oleaginous may range from 30 to 95 volume percent or 40 to 90 or 45 to 85 volume percent in other embodiments.

In embodiments using an oleaginous fluid, the oleaginous fluid may be selected from the group including mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

The non-oleaginous fluid used may be a liquid and in particular embodiments is an aqueous liquid. For example, the non-oleaginous liquid may be selected from the group including sea water, a brine containing organic and/or inorganic dissolved salts, liquids containing water-miscible organic compounds and combinations thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. A brine may include halide, formate, phosphate, polytungstate, or carboxylate salts of mono- or divalent cations of metals, such as cesium, potassium, calcium, zinc, and/or sodium. Specific examples may include KCl, NaCl, NaBr, CaCl2, CaBr2, KFormate, CsFormate, ZnBr2, CsBr, and mixtures thereof. The density of the drilling fluid may be controlled by increasing the salt concentration in the brine (up to saturation).

In addition to the base fluid and chemical precursors, the fluid may also be formed with a surfactant, shale inhibitor (such as an amine, acrylamide-based polymer or lignosulfonate), etc.

The fluids of the present disclosure may be used with almost any type of liner or and/or sand control screen assembly. These may include pre-holed liners, slotted liners, wire-wrapped screens, prepacked screens, direct-wrapped sand screens, mesh screens, premium-type screens, etc. Premium-type screens typically consist of multi-layers of mesh woven media along with a drainage layer. Premium-type screens do not have a well defined screen opening size. In contrast, wire wrap screens consist of wire uniformly wrapped around a perforated base pipe. The wire wrap screens have a relatively uniform screen opening defined as gauge opening. Further, as described above, the sand control screen assembly may also include those with alternate flow paths or shunt tubes. Moreover, screen assemblies may also include those that include diverter valves for diverting fluid returns through a shorter pathway, preventing pressure build up during the gravel packing process. Other completion equipment with which the oleaginous-based fluids may be used includes packer assemblies (including swell packer assemblies), which separate upper annuli from lower production equipment in a well, or inflow control devices, which limit the inflow of fluids into the production tubing) The particular type of equipment is of no limitation on the present disclosure; rather, the fluids of the present disclosure may be used with any type of equipment while the equipment is being run in the hole or during subsequent completion operations prior to the well being put into production. Further, depending on the arrangement, one or more of such completion equipment may be used in combination with each other.

In some embodiments, the screen or liner may be coated (at the surface) on one or both sides with a degradable or dissolvable film to prevent the undesired invasion of the solids free fluid containing chemical precursors while it is being pumped/placed in the annulus between the screen and formation. Once reaction between the chemical precursors occurs (and at least a portion of the fluid volume is converted to solid particles or beads, the film on the screen may degrade and/or dissolve prior to the well being put into production. Further, upon removal of the film, any remaining fluid volume in the annulus may be flowed through the screen and into the surface. In one or more embodiments, the removal of the film may occur by application of a chemical dissolver or breaker that may be pumped to the screen from base pipe that extends inside the screen. The coating may be, for example, wax, polylactic acid, polyglycolic acid, or dissolvable metal oxides. The breaker may depend on the coating type selected and the chemistry of the solid particles (so that the film but not the solid particles may be degraded or dissolved), and may be, for example, a solvent, water, acidic or basic solution, oxidative breaker, etc.

In accordance with embodiments of the present disclosure, prior to installing sand control screens and pumping the present fluid, the drilling fluid may optionally be first displaced from the open hole section to a displacement fluid, and a second fluid may optionally be used to displace the fluid in a cased hole section. However, in accordance with other embodiments, the drilling fluid may be displaced after the sand control equipment is emplaced in the hole. Displacement of the drilling fluids from the open hole section may be carried out by introducing the displacement fluid into the wellbore by passing the displacement fluid through the tubular drill string to the open hole section. In some embodiments, the drilling fluid may be displaced by the fluid of the present disclosure, while in other embodiments, a separate displacement fluid may be used between the drilling fluid and the fluid of the present disclosure. As the displacement fluid (present fluid or separate fluid) is pumped through the drill string, the drilling fluids in the open hole section are carried upward through the annulus formed by the casing and the drill string. The volume of first displacement fluid used may be sufficient to displace the open hole section plus the cased hole section up to the packer setting depth. In one or more embodiments, the first displacement fluid may be present in the wellbore while the screen assembly is run and installed in the wellbore. In such embodiments, the displacement fluid may be referred to as a screen running fluid. Such screen running fluids may include, for example, a conditioned drilling fluid, a fluid having solid particles small enough to pass through the sand control screens or a solids free fluid.

When a sufficient volume of the first displacement fluid is introduced into the wellbore to displace the drilling fluid from the open hole section of the wellbore, a second displacement fluid (optionally the same or different than the first) may be used to displace at least a portion or all of the cased hole section of the wellbore. The volume of the second fluid may be sufficient to displace the entire cased section above the packer setting depth. This may be carried out by raising the end of the tubular drill string so that it is positioned within the cased hole section above the open hole section so that the second displacement fluid is discharged from the end of the drill string into the cased hole section.

Sand control screens and/or liners, or other completion equipment such as packer assemblies (including swell packer assemblies) or inflow control devices (limiting the inflow of fluids into the production tubing) are then run to target depth, which may optionally be in the presence of the fluids of the present disclosure. The sand control screen may be a standalone sand screen or an expandable sand screen. After the sand control screen is installed, the well may be gravel packed, as disclosed herein. Further, one of ordinary skill in the art would appreciate that one or more of such completion equipment may be used in combination.

Embodiments of the present disclosure may provide at least one of the following advantages. By forming the gravel pack in situ, the gravel packing process may be simplified operationally at the surface. Specifically, the process may be performed with certain operation steps such as mixing the gravel into the fluid, thus also reducing equipment (blender and storage). Additionally, the present fluid may be performed with less pumping power than what is normally used in gravel packing. Further, gravel packing is generally performed with rate limitations on pumping the fluid, whereas such limitations may be broadened or removed in accordance with the present disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for completing a wellbore extending through a subterranean formation, comprising:
    installing a sandface completion assembly comprising a mechanism through which fluid flows in the wellbore, the mechanism having a shearing device selected from a choke, nozzle, or a static mixer;
    pumping a solids-free fluid comprising chemical precursors into an annulus formed between the subterranean formation and the sandface completion assembly;
    flowing the solids-free fluid through the mechanism;
    initiating, with the shearing device of the mechanism, a chemical reaction between the chemical precursors to form a plurality of solid particles in the annulus;
    controlling particle size of the plurality of formed solid particles with the shearing device of the mechanism; and
    forming a pack in the annulus with the plurality of formed solid particles that filters sand and allows formation fluid to flow therethrough.

2. The method of claim 1, further comprising:
    drilling the wellbore with a drilling fluid.

3. The method of claim 2, further comprising:
    displacing the drilling fluid with a screen running fluid.

4. The method of claim 3, wherein the screen running fluid is a conditioned drilling fluid.

5. The method of claim 3, wherein the screen running fluid is a fluid containing solid particles small enough to pass through a plurality of sand control screens of the sandface completion assembly.

6. The method of claim 3, wherein the screen running fluid is the solids-free fluid.

7. The method of claim 1, wherein the sandface completion assembly comprises at least one packer and a plurality of sand control screens.

8. The method of claim 7, wherein the solids-free fluid containing chemical precursors is placed into the annulus through a pipe that extends to a bottom of the sand control screens.

9. The method of claim 7, wherein the solids-free fluid containing chemical precursors is placed into the annulus through a pipe that extends to a top of the sand control screens.

10. The method of claim 7, where the solids-free fluid containing chemical precursors is placed into the annulus before the at least one packer is set.

11. The method of claim 7, where the solids-free fluid containing chemical precursors is placed into the annulus after the at least one packer is set.

12. The method of claim 1, wherein the sandface completion assembly comprises at least one sand control screen that is coated with a degradable or dissolvable material.

13. The method of claim 12, wherein the at least one sand control screen is coated with wax, polylactic acid, polyglycolic acid, or dissolvable metal oxides.

14. The method of claim 12, further comprising:
    pumping a chemical breaker to dissolve the coating.

15. The method of claim 14, wherein the chemical breaker is spotted into the at least one screen through a pipe after the plurality of solid particles are formed.

16. The method of claim 1, wherein the sandface completion assembly comprises a plurality of uncoated sand control screens.

17. The method of claim 1, wherein the sandface completion assembly is a wire-wrap, direct-wrap, or mesh-type screen.

18. The method of claim 1, wherein the solids-free fluid containing chemical precursors comprises a brine selected from potassium chloride, sodium chloride, sodium bromide, calcium chloride, calcium bromide, potassium formate, cesium formate, zinc bromide, or mixtures thereof.

19. The method of claim 1, wherein the solids-free fluid containing chemical precursors comprises a base oil.

20. The method of claim 19, wherein the solids-free fluid containing chemical precursors comprises an invert emulsion.

21. The method of claim 1, wherein the solids free-fluid containing chemical precursors comprises a shale inhibitor.

22. The method of claim 1, wherein the mechanism is at least one of a flow port and a flow control device.

* * * * *